Oct. 3, 1961 L. NAMENYI-KATZ 3,002,670

MAGNETIC RECORDER

Filed Dec. 9, 1957 3 Sheets-Sheet 1

Inventor
L. Namenyi-Katz
By Mascock Downing & Seebold Attys.

Oct. 3, 1961 L. NAMENYI-KATZ 3,002,670

MAGNETIC RECORDER

Filed Dec. 9, 1957 3 Sheets-Sheet 2

Inventor
L. Namenyi-Katz
By Glascock Downing & Seebold
Attys.

Oct. 3, 1961

L. NAMENYI-KATZ 3,002,670

MAGNETIC RECORDER

Filed Dec. 9, 1957

3 Sheets-Sheet 3

Inventor
L. Namenyi-Katz
By Glascock Downing & Seebold
Attys

United States Patent Office 3,002,670
Patented Oct. 3, 1961

3,002,670

MAGNETIC RECORDER

Laszlo Namenyi-Katz, London, England, assignor to Epsylon Research & Development Company Limited, Bedfont, England Filed Dec. 9, 1957, Ser. No. 701,642
Claims priority, application Great Britain Dec. 14, 1956
3 Claims. (Cl. 226—176)

This invention relates to magnetic recorders more especially of the type suitable for use in connection with computors.

With tape recorders of this type it is essential to be able to stop, start and reverse the movement of the tape in a very short period of time of the order of one milli-second.

Previously used forms of pinch roller have been found to be unsatisfactory in this connection both because of their slow actuation and release times and because of the inertia of the rotating roller.

In the conventional, known, assembly the pinch roller is mounted for free rotation on an arm which is pivoted to allow the pinch roller to be moved towards and away from the capstan. The tape drive is engaged by moving the arm to cause the pinch roller to press the tape into frictional contact with the capstan, which is continuously running at a constant speed, and disengaged by moving the arm carrying the pinch roller away from the capstan. Linkage of a suitable kind must be provided to move the arm carrying the pinch roller. In order to reverse the direction of the tape it is known to employ two capstans rotating in opposite directions, each having a co-operating pinch roller, the mechanism being arranged so that one pinch roller is moved towards its capstan to engage the tape as the other is moved away from its capstan. It is also known to mount the two pinch rollers on a swinging frame which is moved in one direction or the other by means of two electromagnets.

Where it is essential that the tape shall be started, stopped and reversed in the absolute minimum time, as in the case of computers, the arrangements described above are unsatisfactory on several accounts. The weight of the pinch roller, the pivoted arm upon which it is carried and the linkage connecting the arm to the actuating device is not normally very great and the movement necessary to engage or disengage the tape drive is quite small, but when it is necessary to carry out the movement in less than one milli-second the inertia of these parts becomes a substantial disadvantage. Accordingly, it is one object of the invention to provide a capstan and pinch roller assembly for a tape recorder in which the pinch roller is directly mounted on the moving member of an electro-magnetic actuator. Preferably the pinch roller is itself of light-weight construction. In this way the pivoted arm and the linkage are eliminated and the inertia of the pinch roller itself is minimized.

The second account on which the arrangements hereinbefore referred to are unsatisfactory is that when the pinch roller engages the capstan through the tape the capstan must accelerate the pinch roller from a standstill up to its own speed. Even with a light pinch roller an appreciable amount of time is required and during the acceleration period a driving force is applied to one face of the tape by the capstan and a braking force is applied to the other face of the tape by the pinch roller, so that skidding occurs. This skidding causes undesirable wear of the tape. Having regard to these factors, it is another object of the invention to provide a capstan and pinch roller assembly for a tape recorder in which the pinch roller is continuously driven. With this arrangement no time is lost in accelerating the pinch roller and the tape is accelerated more quickly because a driving force is applied to both its faces.

The third account on which existing arrangements fail resides in the rotational inertia of the tape spools from which and to which the tape is fed. These spools may be of substantial size to enable a long tape to be carried and the weight of the tape itself is added. Even if the capstan and pinch roller assembly is capable of effecting rapid reversal of the tape traverse the tape is dragged in its original direction, against the pull of the capstan, until the spool on which it is being wound can be arrested and reversed. It is a further object of the invention to provide, in a tape recorder, a magazine between each tape spool and the recording or reproducing head in which a length of tape is loosely stored so that when the direction of tape traverse is reversed, tape can be drawn from one magazine and fed to the other until the direction of rotation of the tape spools can be reversed. With the addition of the magazines the capstans are only required to reverse the direction of movement of a few inches of tape and the inertia of this amount of tape is negligible.

The invention consists of a pinch roller for a magnetic recorder in which the roller is directly mounted on the armature of a differential electro-magnetic actuator.

The invention will be further described with reference to FIGURES 1 to 9 of the accompanying drawings.

Figures 2, 3:
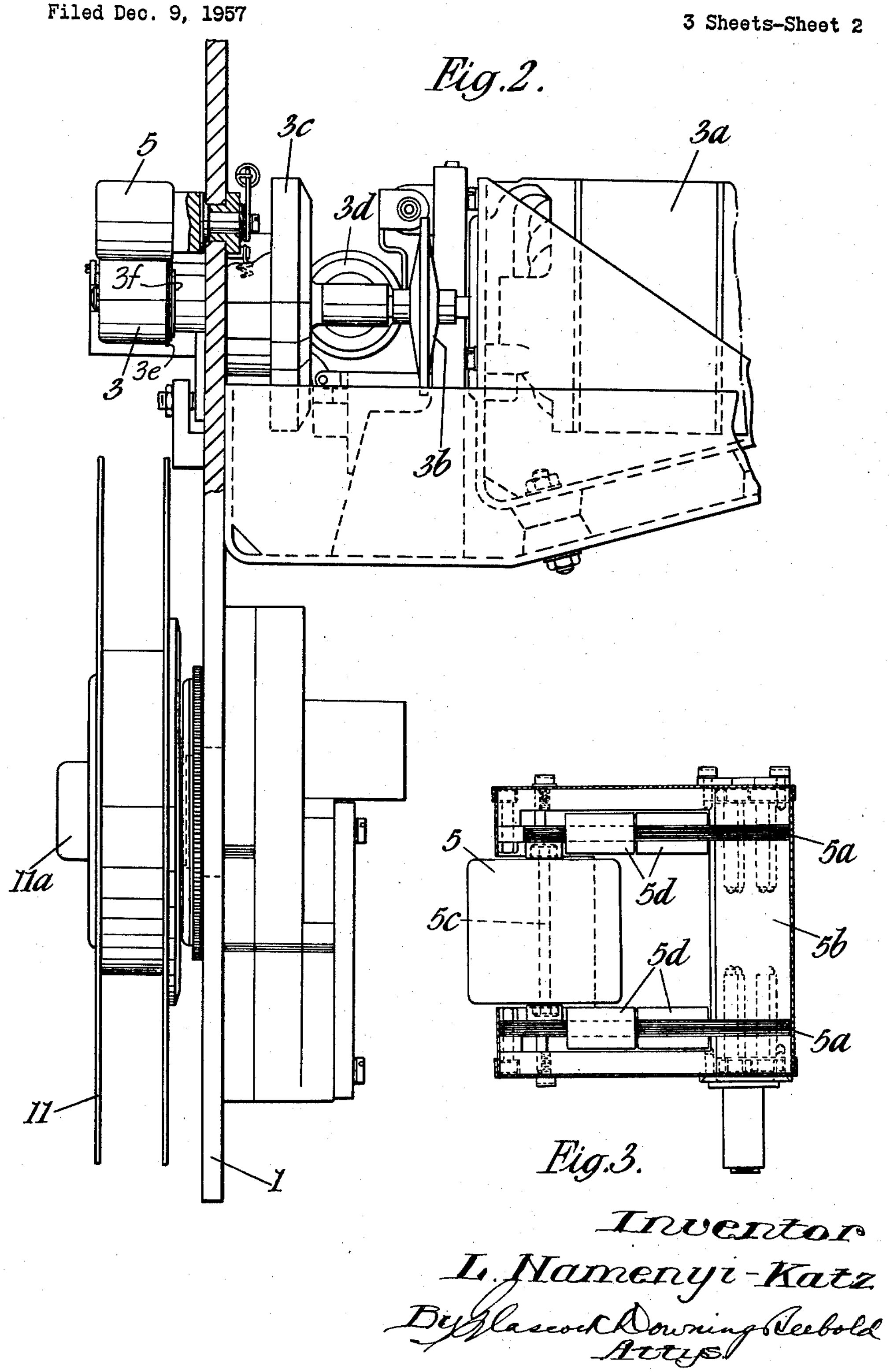
FIGURE 2 is a side elevation of the deck assembly in partial section.
FIGURE 3 is a side elevation of the pinch roller assembly.
Figure 4:
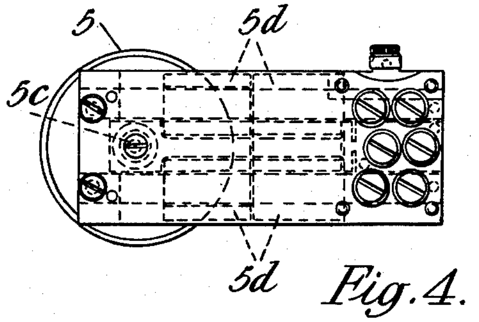

FIGURE 4 a plan view of the assembly of FIGURE 3.

Figures 5, 8:
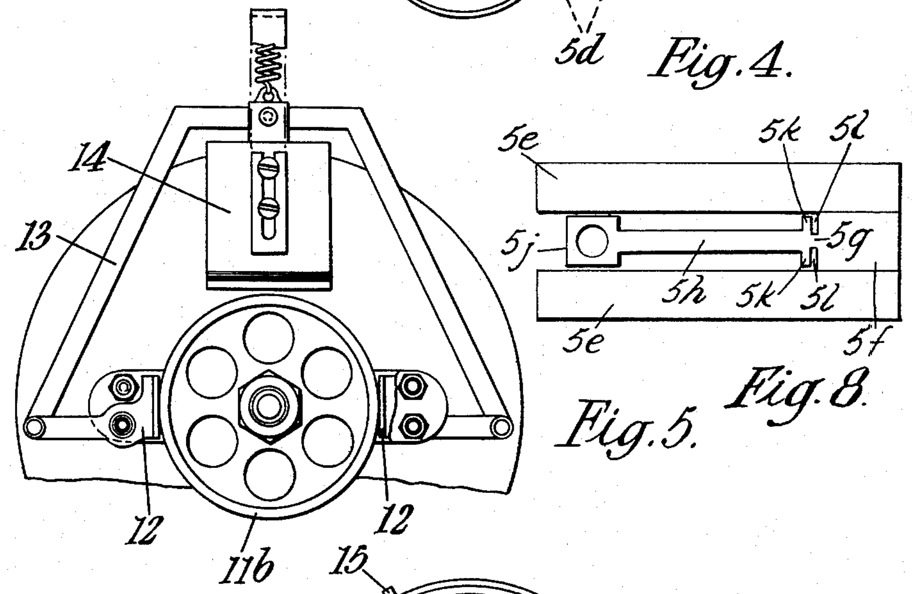

FIGURE 5 is an end view of the spool braking mechanism.

Figures 6, 7, 9:
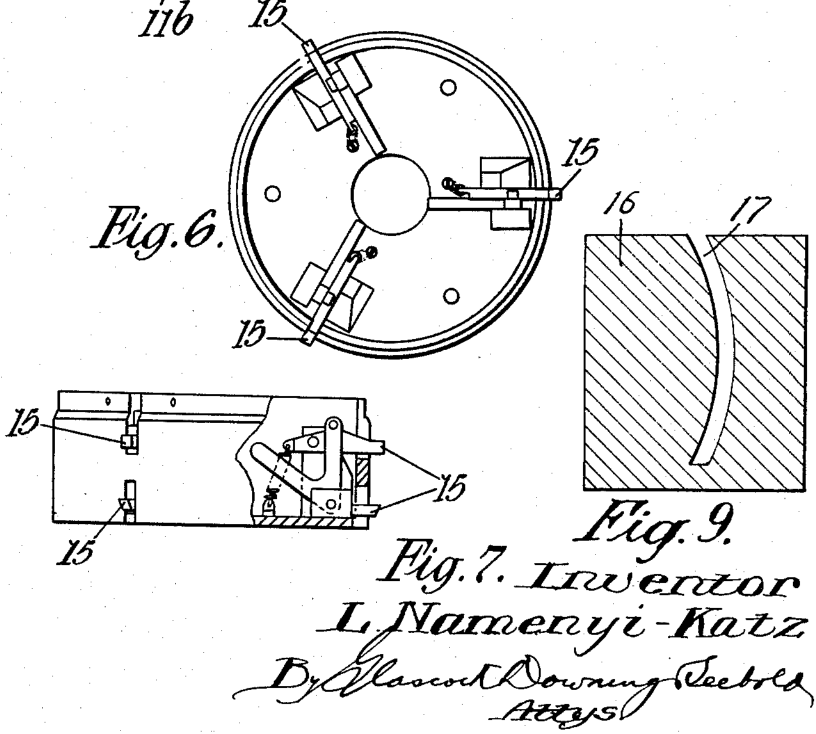

FIGURE 6 is an end view of the spool locking arrangement and

FIGURE 7 a side view in partial section of the spool locking arrangement.

FIGURE 8 is a plan view of the iron circuit of the electro-magnetic actuator.

Figure 1:
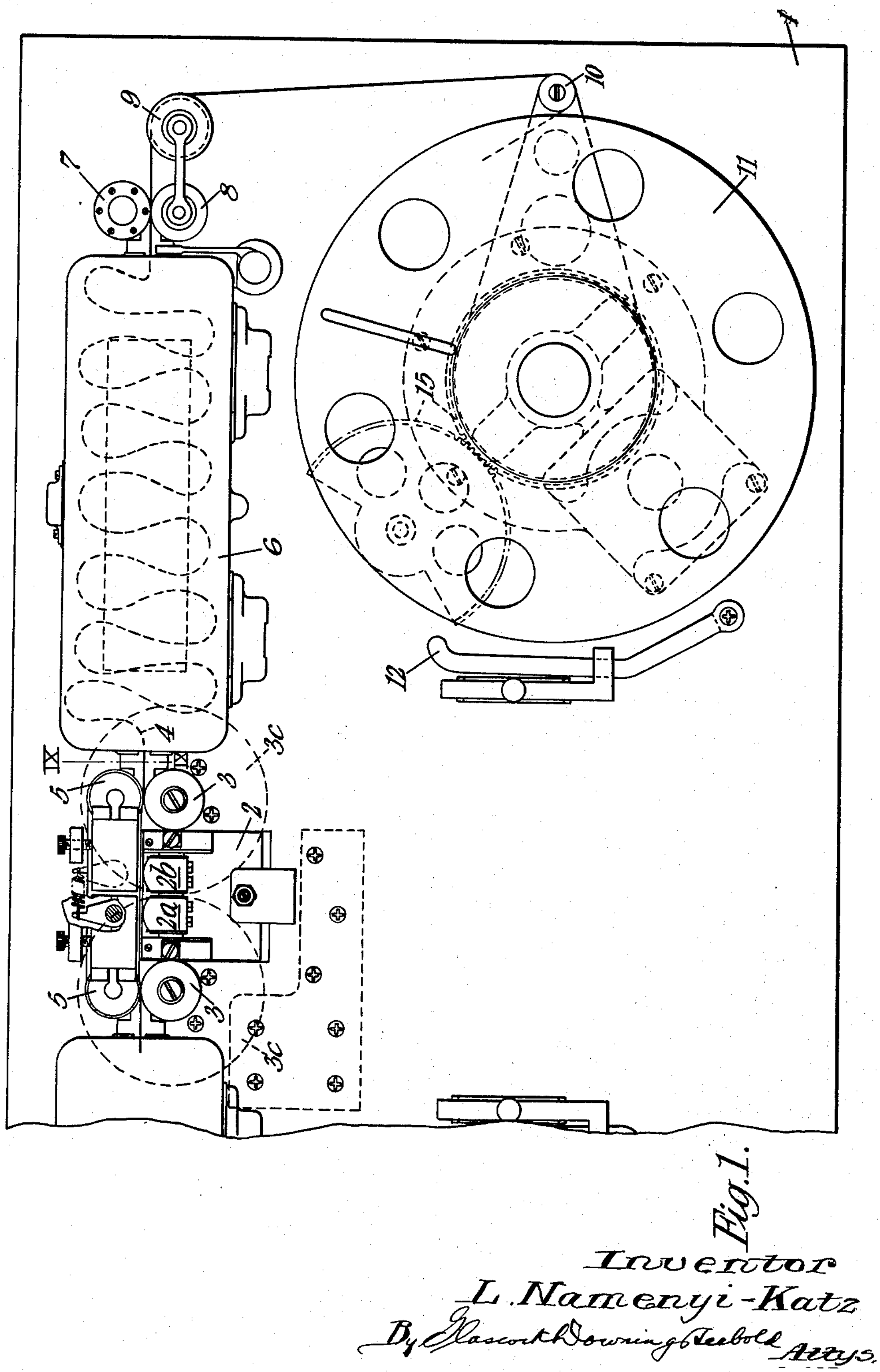
FIGURE 1 is a plan view of the right-hand side of a deck assembly for a tape recorder according to the invention. The left-hand side will be a mirror image arrangement of the right-hand side.

FIGURE 9 is a cross section on the line IX—IX of FIGURE 1.

On a base member or deck 1 there is mounted the head unit 2 which mounts the recording and playback heads 2*a* and 2*b* respectively. On each side of the head unit are the capstans 3 which are driven from the underneath of the deck by motor 3*a*.

The tape 4 will extend over the heads and capstans and will be held up against the latter by means of the pinch rollers 5.

Also mounted on the deck to receive the tape from the heads (or to feed it thereto), is the tape reservoir 6 which is of the kind described in more detail in co-pending British application No. 30,803/55.

From the reservoir the tape extends between an auxiliary capstan 7, which has a fluid drive thereto and an auxiliary pinch roller 8 and thence round a pulley 9 and jockey pulley 10 and on to the spool 11.

As is seen in FIGURE 2, the capstan 3 drives the pinch roller 5 through a rubber skirt 3*e* secured to one end of the capstan. The pinch roller is slightly wider than the capstan and the skirt 3*e* makes contact with the end of the parallel portion thereof nearest the deck. The skirt is supported by a spring steel plate 3*f* underneath it. It will be clear that the skirt could be attached to the pinch roller instead of the capstan.

This ensures that the pinch roller is always running and hence rotational inertia effects do not have to be considered.

The pinch roller assembly is shown respectively in side elevation and plan in FIGURES 3 and 4. It comprises two stacks of E-shaped laminations 5*a* in spaced parallel relationship separated by a yoke 5*b*. The form of the laminations is indicated in FIGURE 4 in dotted outline and is shown in full outline in FIGURE 8. As will be seen by reference to these figures the laminations have two outer limbs 5*e* in the form of plain strips and a center tongue 5*f*. The fixed portion of the tongue 5*f* is joined to the movable portion 5*h* by a narrow neck 5*g*. This neck is sufficiently flexible to allow the head 5*j*, at the other end of the portion 5*h*, to move sideways by the required amount—only about $^{3}/_{1000}$ of an inch—to effect the required purposes. The narrow neck 5*g* would normally constitute a point of high magnetic reluctance in the magnetic circuit and to reduce the reluctance as far as possible the portion 5*h* has an extension 5*k* on either side thus producing two narrow gaps 5*l* over which a substantial proportion of the flux can pass.

A winding is provided around each limb and tongue of each stack of laminations, these being indicated by 5*d* in FIGURES 3 and 4. The pinch roller 5 is carried on a shaft 5*c* which is rotationally supported in bearings carried by the portions 5*j* of the lamination stacks.

If the windings of the limbs 5*e* are energized with direct current so that a north pole is produced at the extremities of the limbs on one side of the shaft 5*c* and a south pole is produced at the extremities of the limbs on the other side of the shaft, then if a current is supplied to the windings of the tongues to produce south poles at their extremities, the tongues will be attracted to the north poles on the limbs and repelled by the south poles. Reversal of the current in the tongue windings will produce a movement in the reverse direction. The pinch roller is, of course, moved from side to side with the tongues.

As already stated, the required movement of the pinch roller is quite small and in order to reduce the resistance to movement to the lowest possible level the pinch roller is of light-weight, hollow construction. Even a small magnetic actuator of the type described will produce a substantial operating force of the order of 1½ lbs. The arrangement thus provides extremely rapid and positive engagement and disengagement of the pinch roller. The movement has, in fact, been found to occupy less than one milli-second.

Motor 3*a* drives the capstan directly over a rubber coupling 3*b* and bevel wheel 3*c*. The other capstan also has a bevel wheel 3*c* mounted on its shaft and the drive is transferred thereto over an idler 3*d* which is in contact with both bevel wheels.

In operation, with the right-hand pinch roller 5 operated to nip the tape between itself and the capstan 3, the tape 4 is fed into the tape reservoir 6 through a member 16 (FIGURE 9) having a slot 17 which is curved transversely of the tape to improve tape rigidity.

The reversal of direction of tape movement is extremely rapid with the apparatus described, the time required being on milli-second or less. Considerably more time is required to reverse the direction of rotation of the spools which, in addition to their own weight, may carry a considerable weight of tape, and while the spools are being stopped and reversed, tape is drawn from one magazine and fed into the other. It will be appreciated that during the spool reversal period tape is being withdrawn from both ends of one magazine and fed into both ends of the other. When the tape spools have been reversed in direction of rotation they are both made to run at a speed faster than normal by the automatic gear described in the copending patent application hereinbefore referred to until the deficit in one magazine has been made up and the surplus in the other has been withdrawn. The spools then slow down to normal speed.

The tape is drawn out from the reservoir by operation of the spool 11 which draws the tape over pulleys 9 and 10 and over the auxiliary capstan 7 which it can do because of the fluid drive to the capstan.

When the left-hand pinch roller 5 is operated and the right-hand one released, tape is drawn out from the left-hand end of the reservoir shown.

To keep the balance, tape is fed into the reservoir by operation of the auxiliary pinch roller 8 which nips the tape between it and the auxiliary capstan 7 and thus draws off tape from simultaneously released spool 11 over pulleys 10 and 9.

When tape is not being released from the spool the auxiliary capstan 7 will simply take up the slack.

Braking means are provided for the spool drive and means are provided for securing the spool 11 on the spool drive and for readily releasing it by pressure on button 11*a*.

The braking means conveniently comprises diametrically located external brake shoes 12 acting on a drum 11*b* which are adapted to be simultaneously operated by a link mechanism 13 from a solenoid 14 so that one or other of the shoes has a servo action whichever be the direction of rotation of the spool which is braked.

The release mechanism comprises radially projecting, circumferentially spaced, axially spaced pairs of teeth 15 which lock the spool and are withdrawn when the button 11*a* is depressed.

Various modifications may be made within the scope of the invention.

I claim:

1. A capstan and pinch roller assembly for a magnetic tape recorder comprising a capstan, a pinch roller, a shaft carrying said pinch roller, a differential magnetic actuator having two spaced stacks of E-shaped laminations in which the center tongues of said laminations are connected to the outer limbs thereof by narrow necks capable of flexure in their own planes, electrical windings around each of said tongues and outer limbs of each said stack and a bearing for said shaft carried on said center tongues of each said stack, said shaft being carried in said bearings with said pinch roller between said stacks, said capstan and pinch roller being in such spaced relationship that said pinch roller may be moved into and out of tape driving engagement with said capstan by the application of appropriate electrical voltages to said windings.

2. An assembly as claimed in claim 1 wherein the pinch roller is of light-weight hollow construction, whereby the speed of operation of said differential magnetic actuator is increased.

3. A capstan and pinch roller assembly for a magnetic tape recorder comprising a capstan, a differential electromagnetic actuator having two spaced stacks of laminations, each said stack having three parallel limbs, the center limb of each said stack being joined to the other limbs by a narrow neck capable of flexure to allow said center limb to move towards either of said other limbs, an electrical winding on each said center limb, a bearing carried on each said center limb, a spindle mounted between said bearings, a pinch roller carried on said spindle, electrical windings on each said other limb of each said stack, whereby said center limbs may be urged magnetically towards either of said outer limbs to move said pinch roller into or out of tape driving engagement with said capstan, and interengaging driving means between said capstan and said pinch roller whereby said pinch roller is continuously driven by said capstan.

References Cited in the file of this patent

UNITED STATES PATENTS

| | | |
|---|---|---|
| 1,638,098 | Rochette | Aug. 9, 1927 |
| 1,776,093 | Underwood | Sept. 16, 1930 |
| 2,005,738 | Foster et al. | June 25, 1935 |
| 2,266,755 | Herzig | Dec. 23, 1941 |
| 2,695,346 | Robison | Nov. 23, 1954 |
| 2,792,217 | Weidenhammer et al. | May 14, 1957 |
| 2,838,250 | Stavrakis | June 10, 1958 |

FOREIGN PATENTS

| | | |
|---|---|---|
| 519,006 | Canada | Nov. 29, 1955 |
| 725,613 | Great Britain | Mar. 9, 1955 |